Jan. 26, 1960     M. C. GERRARD     2,922,925
PROTECTIVE DEVICE FOR ELECTRICAL CIRCUITS AND APPARATUS
Filed March 13, 1958
2 Sheets-Sheet 1
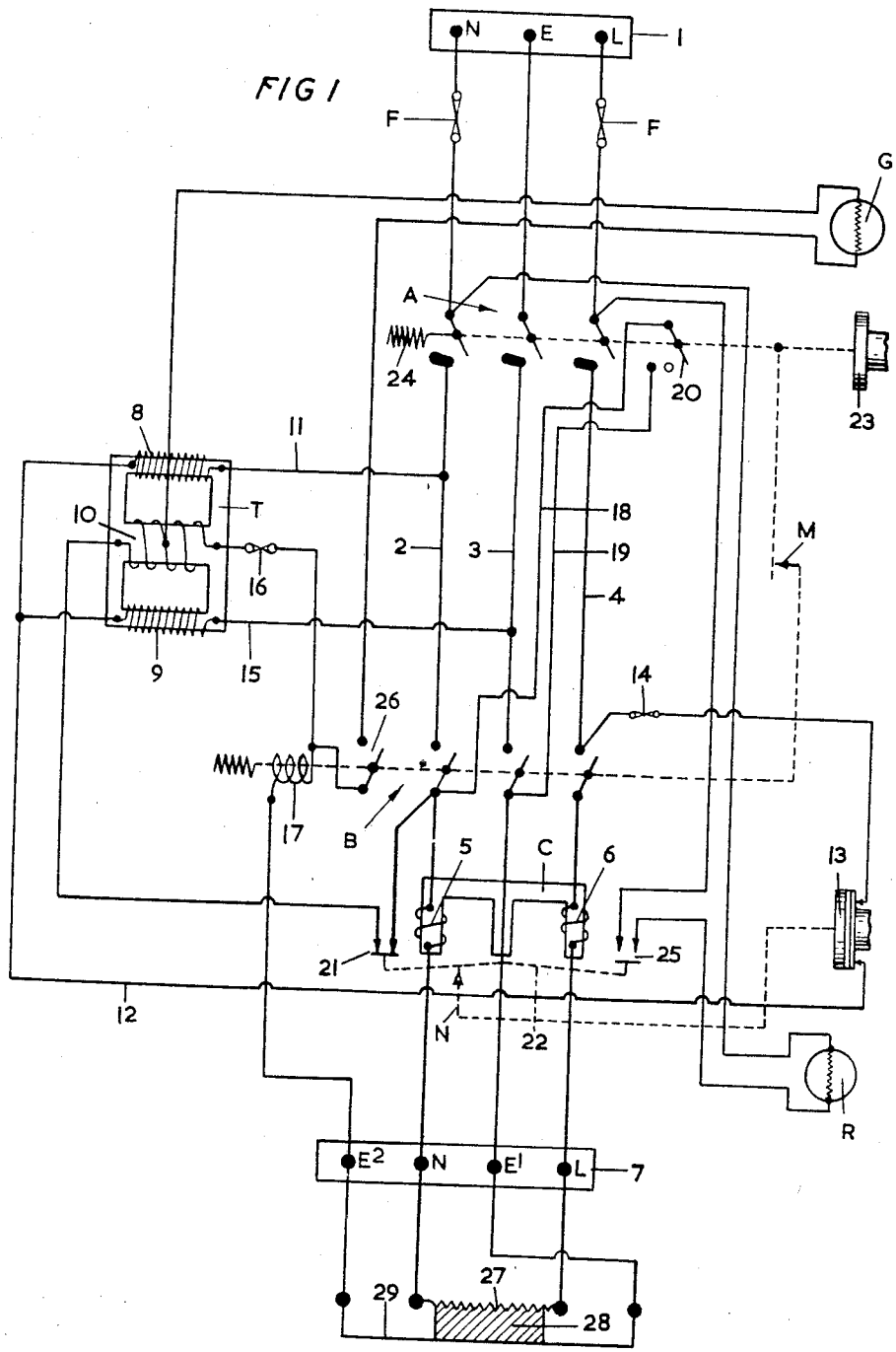

Jan. 26, 1960 M. C. GERRARD 2,922,925
PROTECTIVE DEVICE FOR ELECTRICAL CIRCUITS AND APPARATUS
Filed March 13, 1958
2 Sheets-Sheet 2
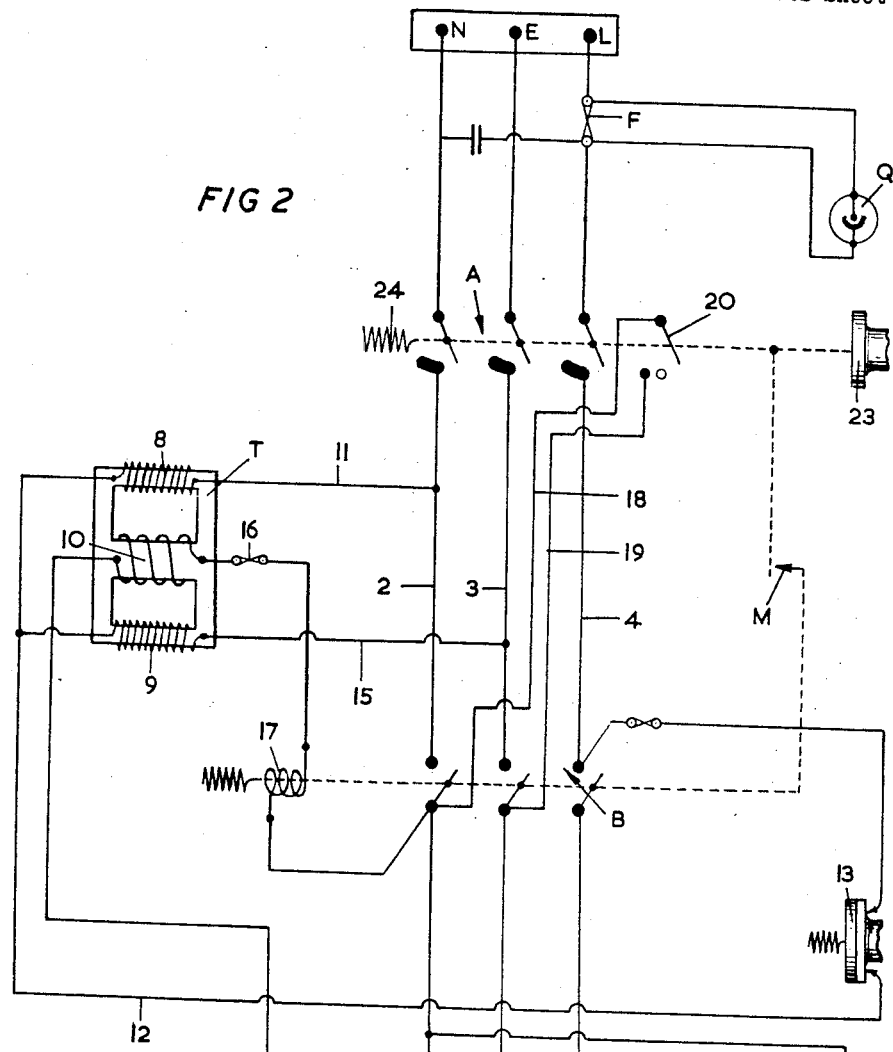
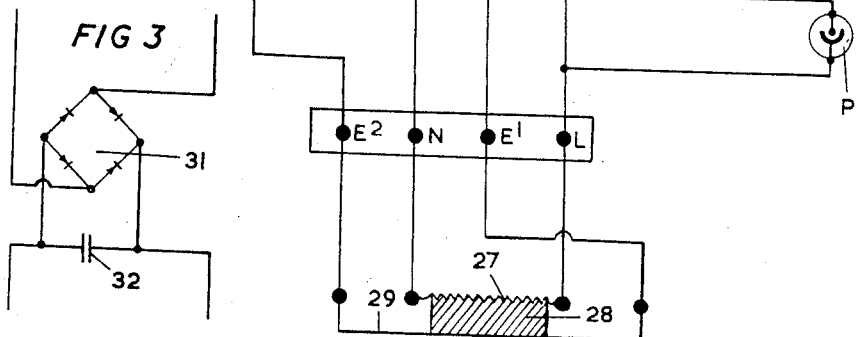

United States Patent Office 2,922,925
Patented Jan. 26, 1960

2,922,925

PROTECTIVE DEVICE FOR ELECTRICAL CIRCUITS AND APPARATUS

Michael Cornelius Gerrard, Cheadle Hume, England

Application March 13, 1958, Serial No. 721,259

Claims priority, application Great Britain March 13, 1957

7 Claims. (Cl. 317—9)

This invention is concerned with a device for protecting alternating current electrical circuits and apparatus, in particular portable apparatus, against dangers arising through faults and also against those arising through incorrect connections being made.

A large proportion of portable domestic electrical appliances such as suction cleaners, hair dryers, lawn mowers, electric blankets, portable drills, are at the present day still only fitted with two-core cables, having live and neutral only, and there is no legal compulsion for the provision of an earth conductor. The consequent danger of the appliance becoming electrically live is increased if in addition the leads are connected wrongly to the supply so that the single-pole switch is in the neutral instead of in the live conductor.

Where three pin earthed supply sockets are provided there is still nothing to ensure that three-core cable is used to the appliance, and furthermore even where three-core cable is used there is no certainty that it will be connected correctly. When it is appreciated that there are six different possible ways of connecting three wires to three terminals, only one of which is correct, it will be understood that it is very easy for an appliance to be wrongly connected to a plug by inexperienced hands. Frequently the appliance works satisfactorily and the danger is not realised until an accident results.

Again, even with the appliance correctly wired to the plug, any interruption of the earth conductor will not be detected and the appliance will continue to be used in a potentially dangerous state. In industry the earth connection of portable appliances is often checked by discharging a heavy current through it from a test instrument from time to time, but no such check protects the domestic user of appliances.

It is known to provide various kinds of safety device including differential transformers and relays, earth-leakage relays, and also transformers of which the secondary winding produces a low-voltage output which causes a current to circulate in the earth lead of the appliance to be protected. However, none of these devices so far proposed has ensured firstly that the earth connection is continuous right back to its point of union with the neutral line of the mains supply, and secondly that the appliance cannot be connected, even momentarily, unless the connections are substantially correct.

The aim of the invention is to overcome these drawbacks and to provide, as far as possible, an effective safeguard both against incorrect connection of the apparatus and against failure of the earth conductor, in addition to the usual fusible links in the supply protecting against overloads and short-circuits.

According to the invention a circuit for connecting an electrical appliance to an alternating current supply, which supply includes an earth conductor, incorporates a relay having contacts which open to isolate the apparatus from the supply, the operating coil of the relay being energised by a magnetic flux derived from a combination of fluxes energised from two different pairs of conductors in the circuit, one of which is the earth conductor, whereby if this magnetic flux is substantially below its correct value the relay will remain open and the appliance will be isolated from the supply.

In the case of a single phase supply the current for the relay coil may for example be derived from a potential source comprising the series-connected secondaries of two transformers, the primaries of which are connected respectively one between the conductor intended to be connected to the live terminal of the supply and the conductor intended for earth, the other between that intended for the live terminal and that intended for the neutral. If the three conductors are correctly connected to live, neutral and earth of the supply, then there will be substantially the full supply voltage across each primary and the resulting secondary voltages, which add up, are arranged to be sufficient to close the relay. If, however, any or almost any of the connections are interchanged, or if there is a break in a conductor, one or other or both of the voltages will not appear and the relay contacts will remain open, isolating the appliance from the supply. It will be appreciated that this circuit according to the invention checks the continuity of the earth connection right back to the point of the mains supply where earth and neutral become common.

According to a further feature of the invention provision is made for the passing of a current continuously through the protective earth sheath of the appliance, and any interruption of this current, such as would be caused by damage to the sheath, will isolate the appliance from the supply. For example, the current to the relay coil mentioned earlier could be passed through the sheath. In an electrically heated blanket, warming pad, mattress or the like, for example, the heating element may be enclosed in a continuous braided flexible metal covering of which one end is earthed and of which the two ends are connected in series with the transformer secondaries mentioned earlier. Then any fracture of the braided covering will interrupt the supply to the relay coil and isolate the appliance.

Two examples of electrical safety devices and a modification will now be described by way of example with reference to the accompanying drawings, in which:

Figure 1 shows the circuit diagram of one form of the device, also indicating the connections to the appliance;

Figure 2 shows the circuit of a modified form, omitting the differential current relay;

Figure 3 shows a modification which may be embodied in either of the circuits of Figures 1 and 2.

Referring first to Figure 1, this shows a form of the device giving maximum protection. The input terminal board or plug is shown at 1, having terminals N, E and L respectively for connection of the neutral, earth and live connections of a single phase, alternating current supply. Normally the supply will be in the form of one phase of a three-phase alternating current supply network and at some point in the network there will be a star-connected transformer the secondary winding of which has its central star joint earthed. The earth wire of the consumer's installation will normally also be connected to an earthing rod or other conductor buried in the ground, and if all the earth connections are correct this earth path should have a resistance low enough to allow any earth faults to circulate through it.

The device according to the invention has, broadly speaking, three conductors 2, 3 and 4 running through it, each broken by a circuit breaker A, and a further circuit breaker B. The neutral and live conductors 2 and 4 each have protective fuses F and series windings 5 and 6 on the outer limbs of a differential current relay C of special construction, to be described later, and then all three conductors lead to an output terminal board or socket 7, which includes an extra earth terminal $E_2$ in addition to an earth terminal $E_1$.

A transformer T has a three-limbed core with two primary windings 8 and 9 and, on the central limb, a single low-voltage secondary winding 10. It will be understood that the transformer T may be replaced equally well by two separate transformers having their secondary windings connected in series. One primary winding 8 is connected through a conductor 11, conductor 12, the contacts of a push-button 13, and a fuse 14 between the neutral conductor 2 and live conductor 4 to produce a magnetic flux dependent upon the alternating potential difference between the conductors 2 and 4. The other primary winding 9 is connected through a conductor 15, and the same conductor 12, contacts 13 and fuse 14 between the earth conductor 3 and live conductor 4 to produce a magnetic fluv dependent upon the alternating potential difference between the conductors 3 and 4.

A connection from one side of the secondary winding 10 is taken through a fuse 16 to the operating or energizing coil 17 of the circuit-breaker B and thence to the terminal $E_2$, and there is a current path from terminal $E_1$, on the output terminal board 7, through the earth conductor 3, conductors 18, 19, contacts 20 on the circuit-breaker A, contacts 21 operated by an armature 22 on the differential current relay C, and thence to the other side of the winding 10.

The circuit-breaker A is closed by means of a push-button 23 against the action of a spring 24, and its construction is such that the contacts 20 are only closed when the button 23 is fully depressed and as soon as it is released the moving parts are returned to a small extent by the action of the spring 24, sufficient to open contact 20 but not the remaining contacts, and the circuit-breaker is held in this position by a mechanical link (indicated diagrammatically at M) with the moving parts of the circuit-breaker B if the latter is energized. On de-energisation of the circuit-breaker B the link M is released and the circuit-breaker A returns to its fully open position.

The circuit-breaker B is closed by energisation of its operating coil 17, deriving its current from the secondary winding 10 of the transformer T.

It is important to note that the sensitivity of the coil 17 is arranged to be such that it will not operate the circuit-breaker B if either of the windings 8 or 9 of the transformer T is not receiving substantially its full voltage to produce in the secondary winding 10 a voltage dependent on the sum of the magnetic fluxes produced by the two primary windings.

The differential current relay C is of three-limbed construction, with a rocking armature 22 pivoted on its centre limb, and provided the current in the winding 5 is not less than that in the winding 6 the armature occupies the position shown, with the contacts 21 closed. An increase in the current in the winding 6, without a corresponding increase in the winding 5 will upset the balance, tilting the armature to open contacts 21 and this also closes a further pair of contacts 25 to illuminate a red pilot light R by connecting it across the mains supply.

A green pilot light G is connected by means of a centre-tap across half the secondary winding 10 of the transformer T, being controlled by extra contacts 26 on the circuit-breaker B.

The appliance which is supplied with current and protected by the device according to the invention is shown diagrammatically in the lower part of Figure 1, and may take the form, for example, of an electrically heated blanket or mattress, an iron, electric drill, vacuum cleaner, food mixer, kettle, or any one of a number of such devices. The current consuming element is indicated at 27 and protected by insulation 28 from the exposed metal frame or casing of the appliance shown at 29. Connections are made from two separate points on the metal frame or casing, one to the terminal $E_1$, and the other to the terminal $E_2$. For example, where the appliance is a heater, such as the electric heating element of a heated blanket or mattress, the element may be enclosed in a flexible braided metal sheath, and the two ends of the sheath are connected to $E_1$ and $E_2$.

The terminal board 7 is conveniently in the form of a socket into which a plug on the end of a four-wire flexible lead from the appliance is inserted.

We will now consider the operation of the device:

If the device has been correctly connected up to the mains supply, and if the push button 23 is now depressed, the full mains voltage is applied to both the transformer primary windings 8 and 9. The resultant voltage set up in the secondary winding 10 causes a current to flow through the operating coil 17 of the relay B through conductors 18 and 19, contacts 20, terminal $E_1$, the two earth leads and the metal frame or housing of the appliance, and back to the winding 10. This energises the coil 17 to close the circuit-breaker B and current passes to appliance. At the same time the pilot light G is illuminated by closure of the contacts 26.

When the button 23 is released the contacts 20 open but the mechanical link M holds the remaining contacts closed. The current to the coil 17 is then maintained through the neutral and earth conductors 2 and 3, right back to that point in the mains supply network at which the earth and neutral are joined, usually the star-point of the secondary winding of a three-phase transformer at some point in the network.

Now if any one of a number of different possible faults arises the device will isolate the protected appliance completely from the supply. For example, if the earth leads to the appliance or the metal frame or casing, or in the case of a heating element the braided sheathing, is broken at any point and circuit to the coil 17 is broken, the circuit-breaker B opens, and circuit-breaker A is also opened by the release of the link M. The light G goes out. The same result is achieved if there is any interruption or undesirably high resistance in the earth connections of the supply. If an earth fault develops in the insulation 28 of the appliance then at least part of the current flows through the earth 3 instead of the neutral conductor 2, so that the current in the winding 5 falls, the balance in the relay C is upset, and the contacts 21 are opened, with the same result as before, but in addition the red pilot light R is illuminated to indicate the presence of a fault to earth.

Now if the appliance had been incorrectly connected in the first place, for example with the live and neutral leads 2 and 4 connected respectively to the neutral and live conductors of the supply, then the winding 9 of the transformer T would have received no current and the output in the secondary winding 10, being half the normal figure, would be insufficient to energise the coil 17 of the circuit-breaker B.

Likewise, if the earth and live connections were interchanged there would be no current in the primary winding 8, with the same result.

If at any time it is desired to trip the device the user has only to depress the button 13, breaking the supply to both the primary windings 8 and 9 of the transformer T. A mechanical link N on this button also enables it to be used to reset the differential current relay C.

It will be seen that the device protects the appliance not only against earth faults, a breakage in the earth leads, or incorrect connection of the appliance, but also against a failure in the continuity of the earth connection of the supply and against any potentially dangerous incorrect connection of the device to the supply. Furthermore the failure of any electrical component within the device will cause disconnection of the supply.

The modified form shown in Figure 2 is similar to that of Figure 1 apart from the omission of the differential current relay and a rearrangement of the pilot lights. Corresponding parts have the same reference letters and numerals as in Figure 1. This simplified form of the device is less sensitive than that of Figure 1 in that an earth fault between the current-carrying conductor and the earth leads or housing of the appliance will only be cleared by the blowing of a single fuse F in the live conductor 4, but otherwise the protection is the same, against incorrect connection and against interruptions of earth continuity. Instead of the pilot lights R and G there is a neon lamp P across the live and neutral output leads of the device indicating when current is available at these two points on closure of the circuit-breaker B, and a further neon lamp Q across the fuse F lights up only when that fuse blows.

In certain circumstances, where the mains supply network is such that there may be an appreciable voltage drop in the neutral conductor, producing a potential difference between neutral and earth, the working of the device may be adversely affected, since this potential difference will appear in series with the voltage of the secondary winding 10 of the transformer T, either augmenting or opposing it, depending on the phase relationship. Accordingly Figure 3 shows a modification which may be embodied in the device of either Figure 1 or 2 to overcome this difficulty. This comprises simply the insertion of a full-wave rectifier bridge 31 between the output terminals of the secondary winding 10 and the low-voltage circuit it supplies. Then the current circulated through the earth connections of the appliance, through the coil 17, and through the earth and neutral conductors of the supply, is a direct current, and is not affected by any stray alternating current potential differences, which may in any case be by-passed by a capacitor 32.

It will be understand that the arrangement of the pilot lights shown in the figures may be altered in many different ways without affecting the main purpose of the invention.

The device may be used to protect not only against electrical faults but also against overheating within the appliance it protects, if use is made of the recently developed insulating materials of which the electrical resistance falls comparatively quickly to a low value above a pre-determined temperature. If such a material is used as the insulation 28 between the element and casing of the appliance, then if the element overheats, or if the appliance catches fire, the resulting current path to earth will upset the balance of the differential current relay C and the appliance is isolated. Then when the appliance has cooled and the insulation has recovered its properties, it may be reconnected to the supply. In this way it may be possible, especially for example in electric kettles and in electrically heated blankets and mattresses, to eliminate the need for any of the normally provided protective devices such as low-melting-point links or thermostats.

The device according to the invention is conveniently constructed as a compact unit adapted to be disposed near a domestic wall outlet socket or it may be mounted on the wall in place of such a socket, and it is itself provided with an outlet socket to receive a plug connected to the appliance. The unit may if desired be provided with two or more outlet sockets to accommodate a number of appliances, in which case it is arranged that the insertion of each additional plug interrupts the earth loop and connects in series with it the earth leads and casing of the further appliance.

As used in the claims, the term "first, second and third conductors" is intended to respectively refer to the live, earth and neutral conductors 4, 3 and 2, while the term "first, second, third and fourth output terminals" is intended to respectively refer to the terminals L, $E_1$, N and $E_2$.

I claim:
1. A protective device for alternating current electrical circuits comprising input and output terminal boards, first, second and third conductors, said conductors extending between said terminal boards, means producing a magnetic flux dependent upon the alternating potential difference between said first and second conductors, means producing a magnetic flux dependent upon the alternating potential difference between said first and third conductors, means producing a voltage proportional to the sum of said magnetic fluxes, a circuit-breaker having an energizing coil, contacts on said circuit breaker interrupting each of said conductors, said coil being adapted on energisation to close said contacts, an electrical connection between one side of said coil and one side of said voltage-producing means, a connection between the other side of said coil and said second conductor and a connection between the other side of said voltage-producing means and said third conductor.

2. A protective device for alternating current electrical circuits comprising first, second and third input terminals, first, second, third and fourth output terminals, first, second and third electrical conductors extending respectively between said first input and output terminals, said second input and output terminals and said third input and output terminals, means producing a first magnetic flux dependent upon the alternating potential difference between said first and second conductors and means producing a second magnetic flux dependent upon the alternating potential difference between said first and third conductors, means producing a voltage dependent on the sum of said first and second magnetic fluxes, a circuit-breaker having an energizing coil, first, second and third contacts on said circuit-breaker, said contacts interrupting respectively said first, second and third conductors, said coil being adapted on energisation to close said first, second and third contacts, an electrical connection between one side of said coil and one side of said voltage-producing means, an electrical connection between the other side of said coil and said third conductor, and an electrical connection between the other side of said voltage-producing means and said fourth output terminal.

3. A protective device for alternating current electrical circuits as set forth in claim 2, including a differential current relay, first and second windings on said relay, said windings being connected respectively in series, in said first and second conductors at points between said contacts and said output terminals, contacts on said relay, said contacts being connected in the current path between said voltage-producing means and said coil, and being adapted to open when the current in said first winding exceeds that in said second winding.

4. A protective device for alternating current electrical circuits as set forth in claim 2 including a further circuit-breaker, said further circuit-breaker being manually operated, fourth, fifth and sixth contacts on said further circuit-breaker, said fourth, fifth and sixth contacts interrupting respectively said first, second and third conductors between said first, second and third input terminals and the points of connection of said flux-producing means, and a mechanical link between said circuit breaker and said further circuit-breaker whereby the contacts of said further circuit-breaker are only maintained closed if said coil is energised.

5. A protective device for alternating current electrical circuits as set forth in claim 4, including a seventh contact, said seventh contact being mounted on said further circuit-breaker and arranged whereby it is closed by manual operation of said further circuit-breaker but is not maintained closed by said mechanical link, and said seventh contact being electrically connected between said second and third output terminals.

6. A protective device for alternating current electrical circuits as set forth in claim 5, including an eighth contact, said eighth contact being mounted on said first-mentioned circuit-breaker, a pilot lamp, and an electrical connection between said eighth contact and said pilot whereby said pilot lamp is illuminated on closure of said circuit-breaker.

7. A protective device for alternating current electrical circuits comprising first and second terminal boards, first, second and third conductors, each of said conductors extending between said first and second terminal boards, means producing magnetic flux dependent upon the alternating potential difference between said first and second conductors, means producing a magnetic flux dependent upon the alternating potential difference between said first and third conductors, means producing a voltage proportional to the sum of said magnetic fluxes, a circuit-breaker, contacts on said circuit breaker adapted to interrupt at least said first and third conductors at points between the connections of said flux-producing means and said second terminal board, an energizing coil, said coil being adapted on energisation to close said contacts, and electrical connections between said coil and said voltage-producing means.

References Cited in the file of this patent

UNITED STATES PATENTS

| | | |
|---|---|---|
| 1,728,024 | Von Schaubert | Sept. 10, 1929 |
| 2,125,149 | Bruns | July 26, 1938 |

FOREIGN PATENTS

| | | |
|---|---|---|
| 727,966 | Great Britain | Apr. 13, 1955 |
| 738,129 | Great Britain | Oct. 5, 1955 |